May 18, 1937.   N. S. WELK ET AL   2,080,975
LINE FINDER FOR LOOSE LEAF BINDERS
Filed July 26, 1935   4 Sheets-Sheet 2

Nelson S. Welk and
Fred Hocker
INVENTORS
BY Harry Lea Dodson
ATTORNEY.

May 18, 1937.  N. S. WELK ET AL  2,080,975
LINE FINDER FOR LOOSE LEAF BINDERS
Filed July 26, 1935   4 Sheets-Sheet 3

Nelson S. Welk
Fred Hocker
INVENTORS
BY Harry Lea Dodson
ATTORNEY.

May 18, 1937.   N. S. WELK ET AL   2,080,975
LINE FINDER FOR LOOSE LEAF BINDERS
Filed July 26, 1935   4 Sheets-Sheet 4
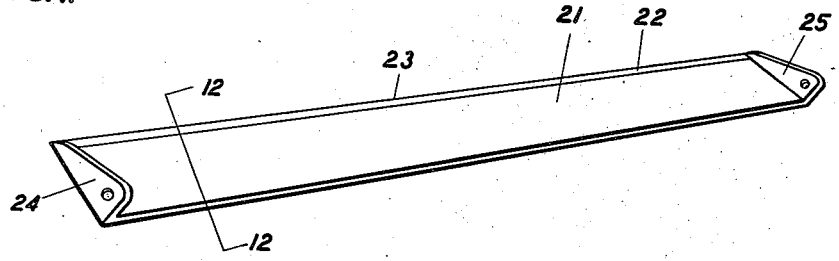
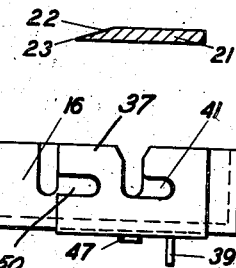
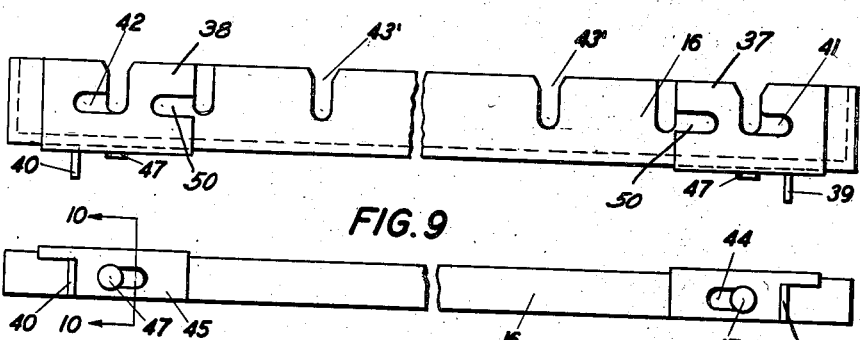
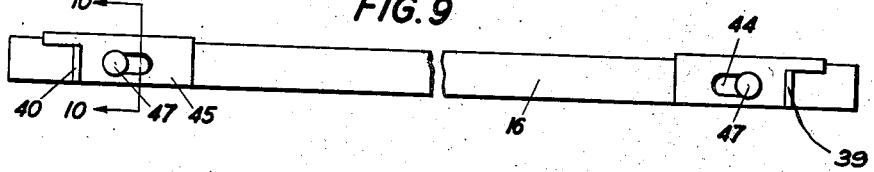
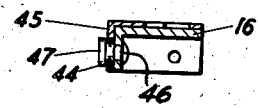
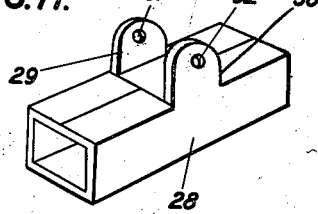
INVENTORS
BY
ATTORNEY.

Patented May 18, 1937

2,080,975

UNITED STATES PATENT OFFICE 2,080,975

LINE FINDER FOR LOOSE LEAF BINDERS

Nelson S. Welk, Athens, Ohio, and Fred Hocker, Harrisburg, Pa., assignors to The McBee Company, Athens, Ohio, a corporation of Ohio Application July 26, 1935, Serial No. 33,196

3 Claims. (Cl. 129—1)

Our invention relates to devices of the character described in United States Patent No. 1,958,743, dated May 15, 1934, which patent describes a peg board having a device for holding a plurality of loose leaves in shingled relation. A frame is provided with right and left side bars provided with rack teeth and a line guide carried by a rotating shaft which has pinions fixedly secured thereto. The pinions mesh with the teeth of the rack so that rotation of the pinions will shift the position of the line finder. A wheel is mounted on the end of the shaft to provide for its convenient rotation.

The principal object of our invention is to provide means whereby the frame of said patent may also be detachably attached to a loose leaf book in which the leaves may be bound in shingled relation.

A further object is to provide convenient means for attaching and detaching the frame to or from said loose leaf book when it is desired to use it in connection with a different set of shingled leaves.

A further object is to provide a supplementary base to be placed under the hinged portion of the binder or loose leaf book so as to cause it to assume a convenient angle for writing or reading when placed upon a desk or table.

A further object is to provide an improved form of bearing for the rotating shaft.

Our means of accomplishing the foregoing objects may be more readily understood by having reference to the accompanying drawings which are hereunto annexed and are a part of this specification, in which—

Fig. 7 is a perspective view of the line finder;

Fig. 8 is a plan view of the cross bar;

Fig. 9 is an edge view of the same;

Fig. 10 is a section on the line 10—10 in Fig. 9;

Fig. 11 is a perspective view of our improved bearing for the rotating shaft; and Fig. 12 is a section taken on the line 12—12 in Fig. 7. Similar reference numerals refer to similar parts throughout the entire description.

Figure 1:
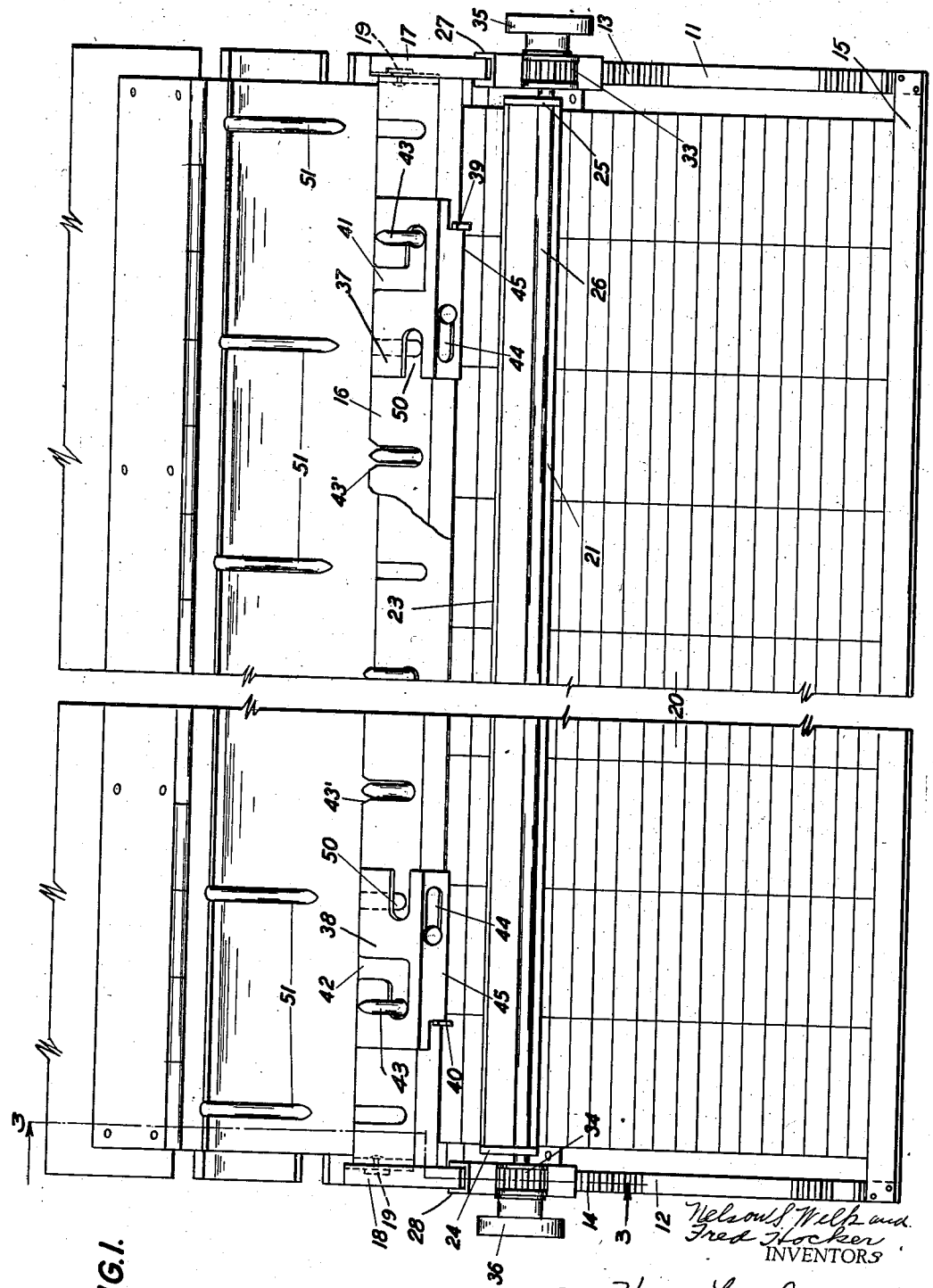
Fig. 1 is a fragmentary plan view of our improved frame secured to a loose leaf binder.
Figure 2:
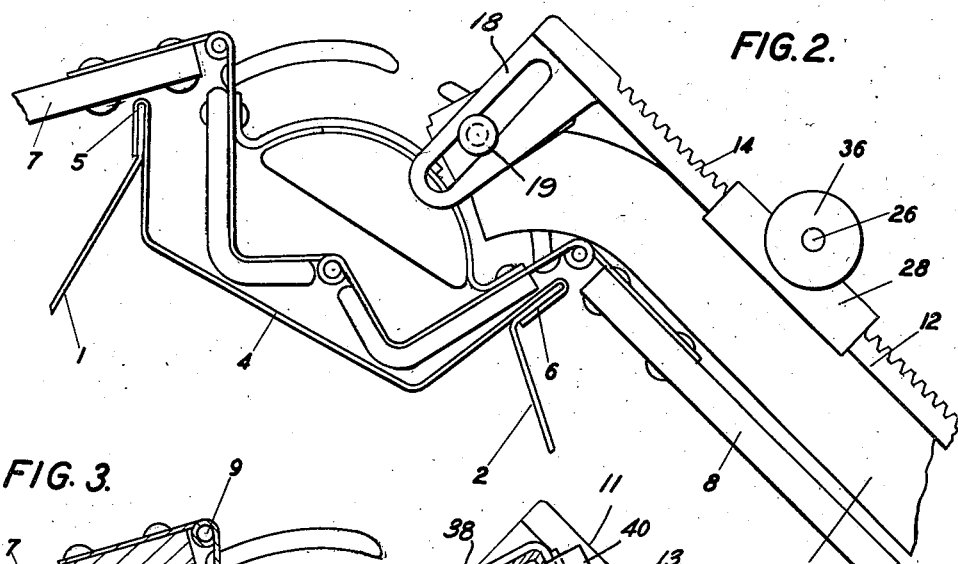
Fig. 2 is a fragmentary end view.
Figure 3:
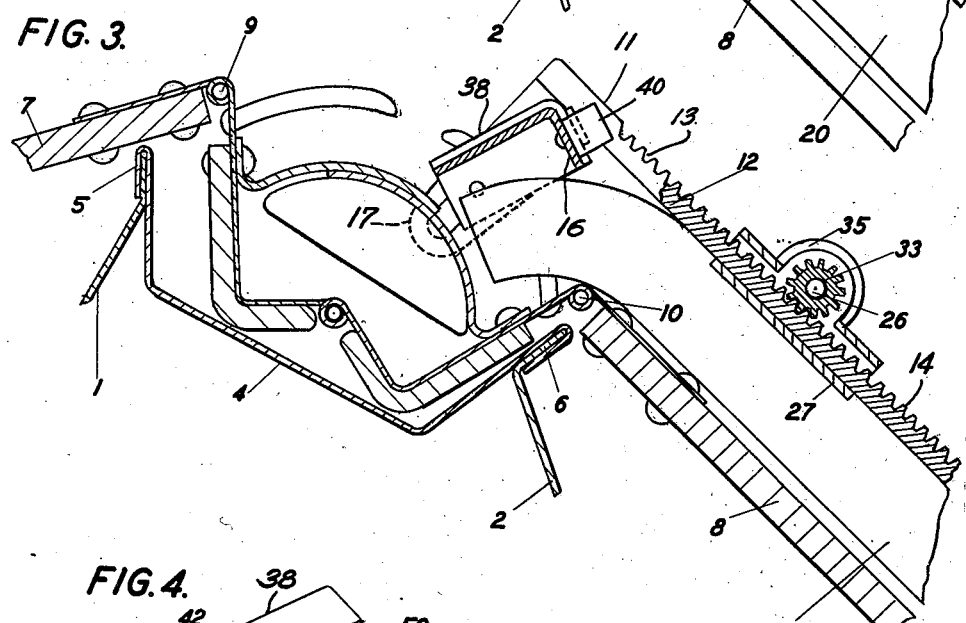
Fig. 3 is a fragmentary vertical sectional view.
Figure 4:
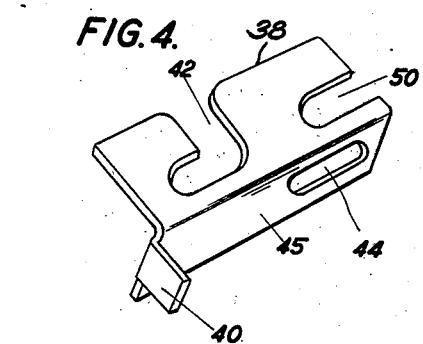
Fig. 4 is a detail view of one of the sliding locks.
Figure 5:
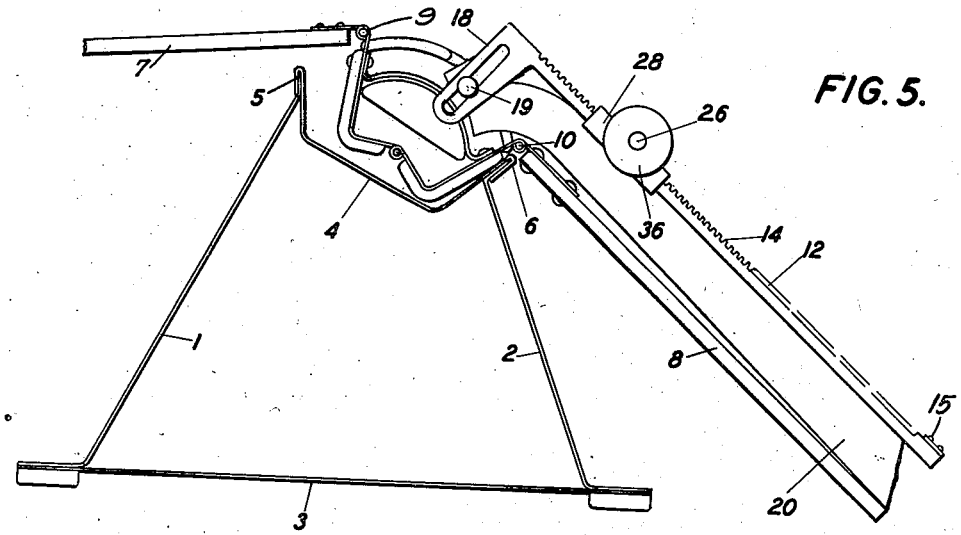
Fig. 5 is a side view of a loose leaf book with our device attached thereto, mounted on our improved base.
Figure 6:
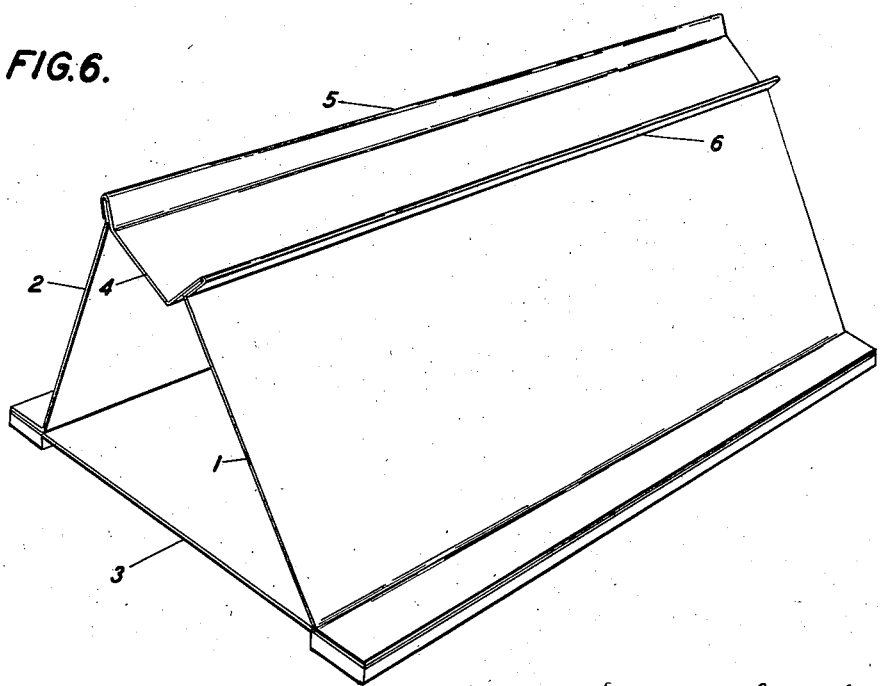
Fig. 6 is a perspective view of the base.

As shown in the drawings the supporting base is formed of two inclined front and back plates 1 and 2, which are connected at their lower portions to a bottom 3 which may be secured to plates 1 and 2 in any desired manner. A channel 4 is fixedly attached to the upper part of the plates 1 and 2. The connecting edges 5 and 6 are formed to clear the covers 7 and 8 of a loose leaf book at a point near the hinges 9 and 10. In this way we avoid any undue stress upon them due to the weight being incorrectly supported at this point. It may be found desirable to pad the channel 4 with corduroy or other suitable material to protect books or binders which have leather coverings. Our frame comprises the side bars 11 and 12 provided with rack teeth 13 and 14 thereon. These side bars 11 and 12 are held in parallel position by a cross bar 15 at their lower ends. At the upper ends of the bars 11 and 12 we provide two downwardly slotted arms 17 and 18 which are secured to said bars by spot welding or in any other convenient manner. The ends of the cross bar 16 are slidably secured to the slotted arms 17 and 18 by means of rivets 19 which extend through the slots in the arms 17 and 18 so that bar 16 slides freely with relation to the arms 17 and 18. The slots in the arms 17 and 18 permit the operator to locate the frame in an elevated or lowered position according to the number of leaves of paper 20 on which the frame rests through the medium of the line finder blade 21 since the rivets 19 are freely slidable in the slots. Our improved line finder (see Figs. 7 and 12) consists of a flat blade 21 which as clearly seen in the drawings is pivoted on the shaft 26 in such a manner that by gravity its front is always pressing down on the sheets of paper. The flat blade 21 has its front or upper edge beveled as at 22 forming a knife edge 23. This construction prevents any confusion of data entered on the leaves 20 directly under that to be read and the beveled edge facilitates a more accurate reading. The flat blade 21 is formed with ears 24 and 25, one at each end. These ears are provided with apertures adjacent the rear portion through which the rotating shaft 26 passes. This shaft is carried in journal boxes 27 and 28. These boxes, clearly seen in the detail view, Fig. 11, are slidably mounted on the racks and are formed with upwardly extending lugs 29 and 30 which have journal bearings 31 and 32 formed therein in which the shaft 26 rotates. Pinions 33 and 34 are fixedly mounted on said shaft 26 in position to mesh with the teeth of the racks. Wheels 35 and 36, which preferably have knurled edges, are mounted on the ends of the shaft 26 for convenient rotation of the shaft 26. Our means of detachably securing the cross bar 16 to the loose leaf binder is clearly seen in Figs. 1, 4, 5, 8 and 9 and comprises a right and left locking plate 37 and 38 which are formed with thumb pieces 39 and 40, and slots 41 and 42, which are L-shaped, in plan, and are adapted to receive the prongs 43 of the loose leaf binder. It is also necessary to provide open slots 43' to receive other prongs. Where the binder is provided with a staggered arrangement of prongs, then it will be necessary to provide a second set of slots 50 in plates 37 and 38 to receive the alternate prongs 51 when the binder is reversed. The lock plates are each slidably secured to the cross bar 16 by means of a slot 44 formed in a depending flange 45. A rivet 46 secured to the cross bar 16 extends through the slot 44, its head 47 holding the lock piece slidably in position.

As is well known to persons skilled in the art, this type of binder is made with a detent device which locks the book in closed, opened, or half opened positions, said detent being released by thumb pressure. When the loose leaf binder is closed or half closed the tapered ends of the staggered prongs overlap and in this position the sheets 20 may be thrown back in the book without becoming detached or partly detached from the prongs. If it is desired to use the device to aid in reading data entered upon the underside of the sheets, the book is placed in the closed, or half-closed, position and the sheets are thrown back, transferring them from one row of prongs to the other. The book is then turned end for end and the device removed and suspended from the row of prongs now in the forward position with the lock slide attached to prongs located in the end opening slots 50.

The operation of the device is as follows:

*Operation*

In operation the loose leaf book is placed upon the base which because of its angular positioning with relation to the loose leaf book will cause the book to assume a partially opened position with sheets thrown back to bring uppermost that one from which it is desired to read. In this position the prongs to which the frame carrying the line guide is to be attached are exposed and in convenient position for attaching the frame. The frame is then attached by sliding the lock pieces 37 and 38 outwardly, by pressing upon the thumb pieces 39 and 40. In this position the slots 41 and 42 coincide with the slots 43', also the inside edges clear the adjoining slot so that the prongs may be inserted into said slots and the slides 37 and 38 pushed back into locked position. In this manner the device is hung upon the prongs without the inconvenience of fully opening the book. The wheels 35 and 36 are now rotated to bring the line finder 21 to the top line on the paper.

Obviously the reverse of this operation is carried on when it is desired to remove the frame from the binder. The lock pieces are slid in the opposite position until the prongs are out of the bottom or lower parts of the L-shaped slots and in register with the open portions thereof when the frame can be easily withdrawn from the prongs. It will be clear also that the slots in the arms 17 and 18 will automatically adjust the frame to the number or thickness of the leaves 20.

Having described our invention what we regard as new and desire to secure by Letters Patent is—

1. In a device of the character described, the combination with a loose leaf book having leaf binding members, of a frame having parallel racks at each side, a journal box slidably mounted on each of said racks, said boxes being formed with upwardly extending lugs having journal bearings in them, a rotating shaft mounted in said bearings, pinions fixed on said shaft in mesh with the racks, a line finder connected to said rotating shaft, said finder having a flat portion provided with a knife edge, upwardly extending ears at the ends of said flat portion having openings therein through which the shaft passes, and means to detachably secure said frame to the binding members of said loose leaf book.

2. In a device of the character described, the combination with a loose leaf book having leaf holding prongs, of a frame having parallel racks at each side, a journal box slidably mounted on each of said racks, said boxes being formed with upwardly extending lugs having journal bearings in them, a rotating shaft mounted in said bearings, pinions fixed on said shaft in mesh with the racks, a line finder connected to said rotating shaft, said finder having a flat portion provided with a knife edge, upwardly extending ears at the ends of said flat portion having openings therein through which the shaft passes, means to detachably secure said frame to the prong members of said loose leaf book, said means comprising a cross bar forming a part of said frame, and right and left locking plates thereon provided with L-shaped slots adapted to receive prongs on the book, and to be locked thereto.

3. In a device of the character described, having a rotatable shaft to be mounted above a plurality of sheets of paper, a line finder pivotally mounted thereon, said finder having a flat portion provided with a knife edge, upwardly extending ears at the ends of said flat portion having openings therein adjacent the rear portion of said ears through which the shaft passes, whereby the front edge bears upon the paper on which it rests.

NELSON S. WELK.
FRED HOCKER.